United States Patent

[11] 3,539,243

[72] Inventor Wright H. Scidmore
    Langhorne, Pennsylvania
[21] Appl. No. 805,563
[22] Filed March 10, 1969
[45] Patented Nov. 10, 1970
[73] Assignee The United States of America as represented by the Secretary of the Army

[54] OPTICAL SYSTEM FOR DAY-NIGHT PERISCOPIC SIGHT
    1 Claim, 3 Drawing Figs.
[52] U.S. Cl. .................................................. 350/52, 350/10
[51] Int. Cl. .......................................................... G02b 23/08
[50] Field of Search.......................................... 350/52, 214, 314, 80; 33/(Checked); 356/(Checked); 128/(Checked)

[56] References Cited
    UNITED STATES PATENTS
    3,257,904  6/1966  Scidmore et al. ............. 350/10
    3,454,322  7/1969  Scidmore et al. ............. 350/10X
    3,464,757  9/1969  Schmidt et al. ............... 350/52X
    FOREIGN PATENTS
    6,400,488  7/1965  Netherlands ................. 350/52

Primary Examiner—Paul R. Gilliam
Attorney—Harry M. Saragovitz, Edward J. Kelly, Herbert Berl and S. Dubroff ABSTRACT: A periscope for use with military tanks, the periscope being compact and usable with a three-stage intensifier tube, and possessing high power day and night sighting capabilities as well as unaided day vision.

INVENTOR,
WRIGHT H. SCIDMORE

Patented Nov. 10, 1970

3,539,243

INVENTOR,
WRIGHT H. SCIDMORE
BY: *(signatures)*
ATTORNEYS.

OPTICAL SYSTEM FOR DAY-NIGHT PERISCOPIC SIGHT

The invention described herein may be manufactured, used, and licensed by or for the Government for governmental purposes without the payment to me of any royalties thereon.

Reference is hereby made to patent application, Ser. No. 883,080 of Wright H. Scidmore and Robert S. Wolfe for "Lens Prescription For Optical System For Day–Night Periscopic Sight", filed Dec. 8, 1969 and assigned to the same assignee of this patent application.

This invention relates to optical instruments and more particularly concerns a compact periscopic optical instrument having high power day and night sighting capabilities coupled with means for unaided binocular day vision.

The inventive periscope described herein consists of four major subassemblies, the head assembly, the body assembly, the tube assembly and the reticle projector assembly:

The head assembly comprises a housing containing an entrance window and a rotatable mirror which provides the means for rotating the line of sight from 18° in depression to 60° in elevation. Rotation of the mirror is accomplished by means of an internal geared drive system which is coupled to the machine gun by a mechanical linkage. It is also linked to the major weapon electrically to insure that the periscope line of sight will be synchronized with the main weapon.

The body assembly consists of an aluminum center body assembly and a front and rear cover assembly. The body contains elements of all four optical systems, the filter wheel and operating mechanism, a cavity for the tube housing, and a housing for the regulator assembly. Externally, the filter knob, rheostat knob, and the headrest with its associated adjustments and the eyepiece assembly are mounted on the rear wall; the diopter adjustment knob on the bottom of the center body; the flip mirror lever and reticle projector assembly are mounted on the right side of the housing.

The tube assembly consists of a cover and tube housing and a housing for the oscillator assembly. The cover contains internal cavities for optical elements of the daylight and passive systems. The focus knob for adjusting the image intensifier tube is mounted on the bottom of the cover.

The reticle projector is mounted on the right side of the periscope. It contains several optical elements of the reticle projection system, and the electromechanical components of the reticle drive system. An electrical connector is mounted on a rear wall of the housing.

The optical systems of our inventive periscope comprises the unity-power system, the eight-power daylight system, the ten-power "passive" or night system, and the optical system of the reticle projector. The head assembly contains optical elements common to the unity-power, the 8X daylight system, and the 10X "passive" system. In the 8X and 10X "passive" system all light transmitting elements are coated with reflection reducing films to increase the light transmission through the periscope. The coatings on the optical elements preceding the image intensifier tube are such as to be optimum over the spectral range of the photocathode surface.

The aforementioned provides a general description of our periscopic tank sight capable of use under low levels of illumination, the periscope being compact and yet usable with a three-stage image intensifier tube. Prior art telescopic tank sights providing night vision and unity power capabilities were, for the most part, usable only with single stage intensifier tubes which were short in length and having a curved photocathode. The three-stage image intensifier tube is about three times as long as its single stage counterpart, has a flat cathode and is capable of much greater light amplification thus obviating any necessity of an active mode, such as a searchlight, for example, which may be readily detectable by the enemy. Another prior art telescopic tank sight usable with a three-stage image intensifier tube, while providing a high power night sighting capability and unaided binocular day vision capability, was incapable of providing high power day sighting capability.

It is therefore a principal object of this invention to provide an optical system having high power day and night sighting capabilities, as well as unaided binocular day vision capability.

The exact nature of this invention as well as other objects and advantages thereof will be readily apparent from consideration of the following description and drawings wherein.

Figure 1:
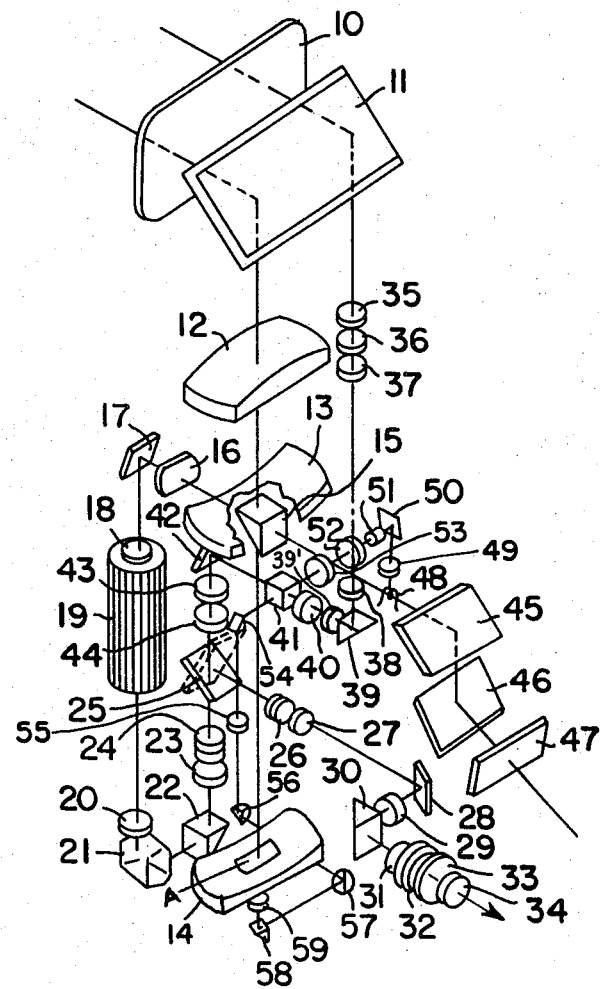
FIG. 1 illustrates a diagrammatic view of the optical system of our inventive periscope.
Figure 2:
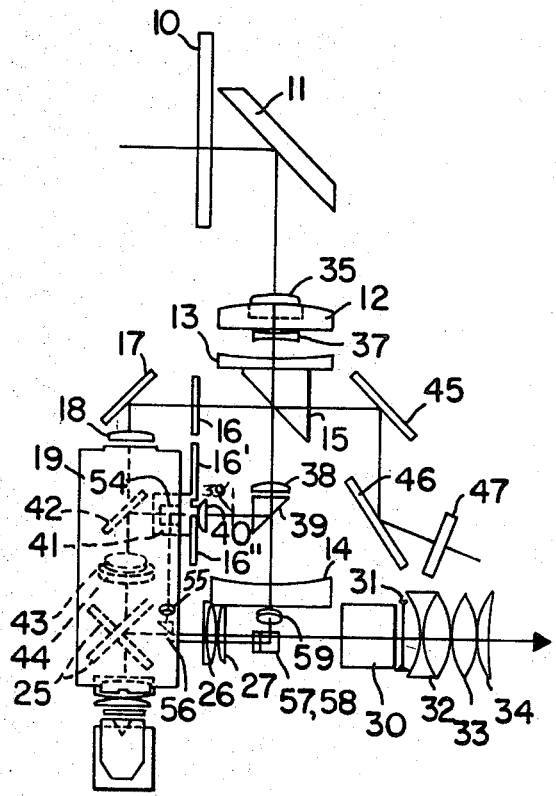
FIGS. 2 and 3 illustrate other views of our optical system.
Figure 3:
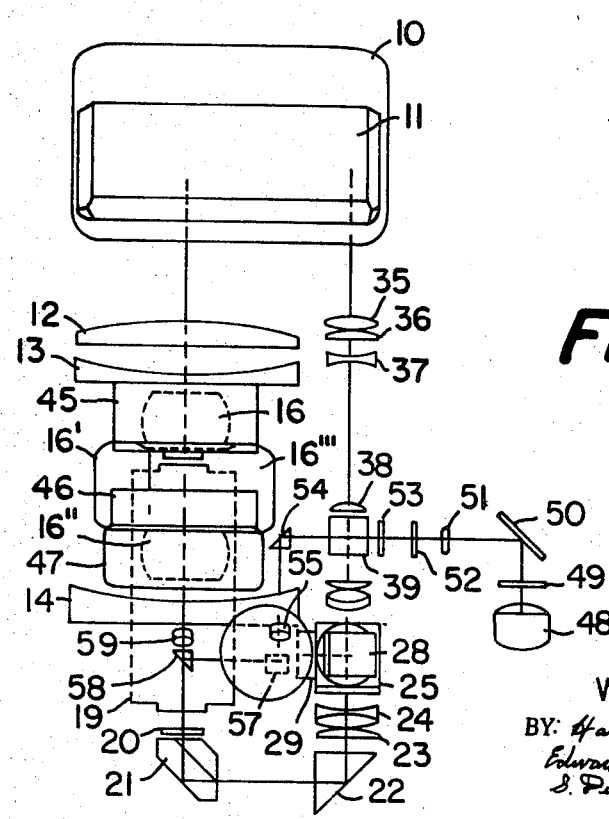

Referring now to the drawings, light enters the instrument through the entrance window 10 and is reflected from the head mirror 11 into the body assembly for funneling into the high power day, the high power night and the unity power day systems. The unity power surveillance channel is always available for use. Either the 8X or 10X night channel can be selected for use by proper rotation of flip mirror 25.

Light rays which contribute to the formation of an image for the 8X day sight are transmitted through entrance window 10, reflected from head mirror 11 into the telephoto triplet objective 35, 36 and 37. The light is then transmitted through collective lens 38 and 90° prism 39 and brought to a focus at the field stop 39' which is located at the exit surface of prism 39. The light is then transmitted through collective lens 40 and beam-splitter prism 41, reflected from fixed mirror 42 and collimated by the first erector lens assembly 43 and 44. Light is then reflected from flip mirror 25, transmitted through the second erector lens assembly 26 and 27, reflected from fixed mirror 28, transmitted through the negative field lens 29 and 90° prism 30 and focused at diaphragm 31. The light is then transmitted through field lens 32, center lens 33, and eye lens 34 which collimate the light for ease of observation. Dioptral adjustment of ± 4 diopters is provided by longitudinal adjustment of the second erector lens assembly. The day sight provides a magnification of 8X, a field of view 8°, and an exit pupil diameter of 5mm.

Light rays from the head assembly which contribute to the formation of an image for the night sight are transmitted through the outer area of corrector lenses 12 and 13 to the primary mirror 14. The primary mirror folds the optical path back 180° and converges the light to form an image after being reflected at 90° prism-mirror 15, transmitted through filter 16, reflected at 90° mirror 17, and transmitted through field-flattener lens 18 at the light sensitive surface of the image intensifier tube 19. Rays from the visible image formed on the screen of the image intensifier tube are transmitted through window 20, Amici prism 21, 90° prism 22, and are collimated by the third erector lens assembly 23 and 24. The rays are then reflected from the flip mirror 25 into the common eyepiece assembly consisting of the second erector lens assembly 26 and 27, mirror 28, lens 29, prism 30, diaphragm 31, lens 32, lens 33, and lens 34. Focusing of the image tube is accomplished by moving field flattener lens 18, the image intensifier tube 19, window 20, Amici prism 21, 90° prism 22, and the third erector lens assembly 23 and 24 as a unit such that the dioptral setting is not affected. The dioptral adjustment of ± 4 diopters is common to the day sight and is accomplished by longitudinal adjustment of the second erector lens assembly 26 and 27. The night sight provides a magnification of 10X, a field of view of 5 ½° and an exit pupil of 7 mm. The catadioptric objective lens, consisting of corrector lenses 12 and 13, primary mirror 14, 90° prism-mirror 15, filter 16, mirror 17, and field-flattener lens 18, has a focal length of 10.2 inches, and F-number of 1.57 in the horizontal meridian and 3.14 in the vertical meridian, and a T-number of approximately 3.1. The filter assembly is comprised of a clear glass window 16, two neutral density filters 16' and 16'', and an opaque disc 16'''. The opaque disc protects the image intensifier tube from possible damage when the night sight is not in use. Neutral density filter 16' and 16'', and opaque disc 16''' are not shown in FIG. 1 to avoid confusion and clutter. The filter is manually rotatable and provides compensation for differing ambient levels of illumination of the target seen.

Light rays contributing to the unity power field are transmitted from the head assembly through the center portion of corrector lenses 12 and 13, are deviated 90° by (1) prism-mirror 15 and (2) mirror 45 and deviated 70° by mirror 46 and transmitted through window 47 to the observer's eyes. The corrector lenses are approximately afocal. The window 47 is a weak negative lens of approximately one half diopter thereby requiring a small, desirable amount of eye accomodation when using the unit power vision system.

Light emitted from lamp 48 is transmitted through window 49 and reflected by mirror 50 illuminating reticle 51. The light from the reticle is then projected through windows 52 and 53 and is combined with the 8X target image at beam-splitter prism 41. The light transmitted through the beam-splitter prism is deviated 90° by prism 54 and is collimated by relay lens 55. This light is then deviated 90° by (1) 90° prism 56, (2) Amici prism 57 and (3) 90° prism 58 and transmitted through lens 59 and the central clear area A of mirror-lens 14 and combined with the night sight target image at 90° prism-mirror 15. Factory alinement of the day and night sights is accomplished by adjusting prisms 57 and 58. Boresight adjustment for both the day and night sights is accomplished in the field by translation of reticle 51 in azimuth and elevation.

I claim:

1. A compact periscope having high power day and night sighting capabilities and an unaided binocular day vision capability comprising:

a periscope head assembly for receiving light rays from object space; and a periscope body for receiving said rays transmitted through said head assembly, said body including a high power night channel, a high power day channel, and an unaided binocular day vision capability, said high power night channel comprising:

an upper corrector lens and a lower corrector lens optically aligned, each of said corrector lenses having an outer portion and an inner portion, said rays passing through said outer portions of each of said corrector lenses; (having an outer portion and an inner portion, said rays passing through said outer portions of each of said corrector lens,)

a primary mirror below said lower corrector lens and optically aligned therewith for reflecting light rays passing through said outer portions of both of said corrector lenses onto a 90° prism-mirror, said primary mirror having an outer reflective portion and an inner transparent portion;

a manually rotatable filter for filtering said rays reflected from said 90° prism-mirror for transmission into a multistage image intensifier tube to form a target image; and optically aligned means for projecting a reticle pattern into said intensifier tube for superimposition thereof on said target image, said means comprising:

a source of light energy;

a reticle for receiving said light energy;

a beam-splitter for said light energy after passing through said reticle, said beam-splitter reflecting a portion and transmitting a portion of said light energy;

a 90° prism for deviating said light energy;

lens elements for directing said deviated light through said transparent portion of said primary mirror into said 90° prism-mirror to substantially follow a path used by said high power night channel into said intensifier tube;

additional optically aligned means for visually observing said images; and optically aligned other means comprising said high power day channel, said other means comprising said high power day channel including:

a telephoto triplet objective for receiving said rays transmitted through said head assembly;

a right single prism for deviating rays passing thru said triplet objective;

a field stop for focussing said deviated rays located at an exit surface of said right angle prism;

a beam-splitter for transmitting a portion of said focussed rays;

a flip-mirror for directing said focussed rays transmitted through said beam-splitter into an erector lens assembly to form erected images; and optical means for observing said erected images, and further means comprising said unaided binocular day vision, said further means comprising said unaided binocular day vision capability including said 90° mirror-prism reflecting light rays passing through a central portion of both of said corrector lenses onto a pair of reflecting mirrors through a window, said binocular day vision capability being devoid of any moving parts.